United States Patent [19]

Wiand

[11] Patent Number: 5,123,958
[45] Date of Patent: Jun. 23, 1992

[54] POLISHING COMPOSITION AND METHOD

[76] Inventor: Ronald C. Wiand, 1494 Heatherwood Dr., Troy, Mich. 48098

[21] Appl. No.: 528,862

[22] Filed: May 25, 1990

[51] Int. Cl.$^5$ .............................................. C09G 1/00
[52] U.S. Cl. ........................................ 106/3; 51/293; 51/295; 51/298
[58] Field of Search ........................ 51/293, 295, 298; 106/3

[56] References Cited

U.S. PATENT DOCUMENTS

| | | | |
|---|---|---|---|
| 3,385,682 | 5/1968 | Lowen | 106/3 |
| 4,169,337 | 10/1979 | Payne | 106/3 |
| 4,218,250 | 10/1980 | Kasprzak | 106/3 |
| 4,462,188 | 7/1984 | Payne | 51/293 |
| 4,581,042 | 4/1986 | Willmore | 51/293 |
| 4,898,598 | 2/1990 | Zapata | 51/298 |

*Primary Examiner*—William R. Dixon, Jr.
*Assistant Examiner*—Willie J. Thompson
*Attorney, Agent, or Firm*—Harness, Dickey & Pierce

[57] ABSTRACT

A marble, granite and stone gel-type polishing composition and method. The polishing composition includes a polishing constituent mixture and a gel-type carrier agent. The gel-type carrier agent at least temporarily maintains the polishing constituent mixture in suspension prior to and during application to the work surface.

9 Claims, No Drawings

POLISHING COMPOSITION AND METHOD

BACKGROUND OF THE INVENTION

The present invention relates to an improved polishing composition for polishing of marble, stone and granite surfaces.

For literally centuries the polishing of marble, stone or granite has been done using the same procedures and ingredients. The only differences in the present time is that motor driven equipment, (i.e. electric or gasoline motors) is presently used to do the work formerly done by hand. The polishing composition which has been used over time has included mixtures of aluminum oxides, tin oxides, silicon carbides, pine resins and lacquer resins. These ingredients, in powder form, are mixed in varying proportions determined by the empirical knowledge of the particular person doing the polishing, based on years of personal experience.

These powders are then mixed with water, worked into a weak slurry or emulsion, by working with the polishing head through and around the water mixture. Usually, this is accomplished by applying about 8 ounces of water with one third of an ounce of the powdered polish mixture sprinkled on the water surface. In the past, this has been accomplished by first pouring the water on the floor and then sprinkling the dry powder mixture over the water, and thereafter working the powder into the surface.

While this process has satisfactorily polished marble floors and the like, there have been some disadvantages in this procedure. First of all, as stated above the actual proportions of ingredients incorporated were commonly prepared by the individual artisan and were not easily duplicated from one job to the next or one person to the next. Thus, a wide variety of skill levels could result wherein only the most skilled artisans could do the best job in polishing of the floor. Secondly, the step of working the polishing powders into water for polishing of the floor usually required about 10 to 20 minutes prior to any actual polishing occurring on the surface to be polished. In addition, because the materials were sprinkled on the floor as powders, the powders would sometimes become airborne or otherwise come in contact with the person. This may result in irritation of the skin or inhalation of the powders, both of which are undesirable to the artisans of the industry.

SUMMARY OF THE INVENTION

In accordance with the present invention, there is provided a gel-type polishing composition which has an advantage in that it substantially solves the above problems. The improved polishing composition of the present invention includes an active polishing constituent mixture, which includes an abrasive grit material, and a carrier agent. The carrier agent at least temporarily holds the polishing constituent mixture intermixed in suspension immediately prior to and during application of the polishing composition to the work surface.

Thus, it is an object of the present invention to provide an improved polishing composition which is gel-like in nature and has the ingredients already incorporated therein, such that measurement on the spot by "feel" or empirical knowledge is reduced.

It is also an object of the present invention to provide a polishing composition wherein less contact between the artisan and the powder constituents of the composition is accomplished.

It is still further an object of the present invention to provide a polishing composition which reduces the time required in prior art compositions until polishing begins.

Additional benefits and advantages of the present invention will become apparent from the subsequent description of the preferred embodiments and the appended claims.

DESCRIPTION OF THE PREFERRED EMBODIMENTS

In accordance with the present invention, a gel-type polishing composition and process for use of the polishing composition in polishing a marble, granite or stone floor is provided. The improved polishing composition of the present invention includes a polishing constituent mixture and a carrier agent. The polishing constituent mixture includes a mixture of polishing materials, such as an abrasive grit material and others, which may be suitable in a particular application. The carrier agent at least temporarily holds the etching agent and the polishing constituent mixture intermixed in suspension immediately prior to and during application of the polishing composition to the work surface.

In a preferred embodiment, a component of the polishing constituent mixture is an etching agent, for etching of the stone surface to be polished. The work surface etching agent is preferably an oxalate source to form an oxalic acid powder material which is intermixed in the polishing composition of the present invention.

The polishing constituent mixture of the present invention also may include the various constituents necessary for a particular application, as may be determined by one skilled in the art. For instance, suitable polishing constituents may include aluminum oxides, tin oxides silicon carbides, pine resins and lacquer resins. These materials are generally in powdered form prior to mixing with a carrier agent of the present invention. Depending on the type of surface, i.e. color or hardness, other constituents may be added or replaced as will be appreciated by those skilled in the art.

In the present invention, the carrier agent is a critical element to produce the gel-type consistency of the resultant polishing composition. The carrier agent may be any type of agent which will hold, at least temporarily, the etching agent and the polishing constituent, including the abrasive grit material, intermixed in suspension, at least immediately prior to and during application of the polishing composition to the work surface. A preferred carrier agent is a polyvinyl alcohol which may be mixed in effective quantities with water to produce a gel-type consistency material in the final polishing composition of the present invention. Generally, the gel carrier of the present invention will include from about 25 parts to about 1 parts by volume polyvinyl alcohol mixed with from about 16 parts to about 4 parts by volume water. Typically, the gel carrier includes from about 6 parts to about 1 parts by volume polyvinyl alcohol mixed with from about 10 parts to about 4 parts by volume water. And preferably, the gel carrier includes from about 4 parts to about 1 parts by volume polyvinyl alcohol mixed with from about 6 parts to about 4 parts by volume water.

As will be readily appreciated, the gel carrier of the present invention may include flocculating agents, such as polyelectrolytes or the like, to assist in retaining the polishing constituent mixture in suspension.

Thus, the carrier of the present invention allows for intermixed suspension of the polishing constituents such that when it is applied to the floor surfaces the polishing constituents are already intermixed and polishing of the surface begins substantially immediately. This reduces the time required in the prior art to mix up the constituents of the polishing composition. Preferably, the carrier selected must be one such that the etching agent and polishing constituent mixture is at least temporarily held in suspension and is compatible with the constituents such that separation does not readily occur prior to application to the work surface.

Generally, the gel-type polishing compositions of the present invention contain: from about 20 parts by volume to about 1 parts by volume of a powdered polishing constituent mixture (which includes from about 4 to about 0.1 parts by volume of the etching agent such as oxalic acid, the remainder being the abrasive grit and pine tar and lacquer resins and etc.); and from about 20 parts by volume to about 0.75 parts by volume of the gel carrier. Typically, the gel-type polishing compositions of the present invention contain: from about 10 parts by volume to about 1 parts by volume of a powdered polishing constituent (which includes from about 3 to about 0.5 parts by volume of the etching agent such as oxalic acid, the remainder being the abrasive grit and pine tar and lacquer resins and etc.); and from about 10 parts by volume to about 0.75 parts by volume of the gel carrier. And preferably, the gel-type polishing compositions of the present invention contain: from about 3 parts by volume to about 1 parts by volume of a powdered polishing constituent (which includes from about 2 to about 3 parts by volume of the etching agent such as oxalic acid, the remainder being the abrasive grit and pine tar and lacquer resins and etc.); and from about 3 parts by volume to about 0.75 parts by volume of the gel carrier.

In accordance with the method aspects of the present invention, a polishing composition including etching agent and a polishing constituent mixture including abrasive grit material are intermixed in suspension in a carrier agent, as described above. This composition is applied to the marble, granite or stone surface. Thereafter, the polishing composition is worked into the stone surface for polishing of the stone surface.

Preferably, a suitable amount of water is placed on the floor surface and the polishing composition is deposited thereon prior to polishing of the floor. Utilizing the polishing compositions and methods of the present invention, it has been found that polishing commences substantially immediately and improved results are obtained. Additionally, the gel-type compositions allows ease of application to vertical surfaces and the like which had been problematic in the past. Additionally, the polishing compositions of the present invention can be readily utilized without dependency on skill level of the artisan.

The following examples are given as further illustrations of the present invention and are not to be construed to be limiting to the present invention.

EXAMPLE I

As an example, a preferred composition of the present invention may include 75 percent by volume, 12 micron particle size aluminum oxide mixed with 25 percent by volume oxalic acid powders. These powders were mixed in a kitchen-type blender with a gel prepared of a mixture of 6 ounces of water and two ounces of powdered polyvinyl alcohol. Thereafter, two ounces of a mixture of pine resin and lacquer resin were blended into the mixture and a resulting gel polishing composition was obtained which contains a proper mixture of polishing constituents.

The gel polishing composition was found to be suitable for polishing marble surfaces.

EXAMPLE II

Eight ounces of water was placed onto a marble floor surface to be polished. About one teaspoon of the gel polishing composition, as prepared in Example I, is applied to the water. The polishing composition is worked into the surface with a motorized floor polisher. The polishing composition is found to provide substantially immediate polishing of the surface. The resulting gloss of the marble was tested using a gloss meter and the polishing surface was found to be 10–12 percent glossier than a comparable surface polished the conventional way.

EXAMPLE III

A gel carrier was prepared by mixing 8 ounces of water mixed with 30 grams of AIRVOL 53 PVA obtained from Air Products and Chemicals, Inc. of Allentown, Pa. and 2 ounces of SUSPEND AID polyelectrolyte composition obtained from K. C. Abrasives of Kansas City, Mo. To this gel was added 42 grams of 1000 grit aluminum oxide and 16 grams of oxalic acid powder. The gel and additions were mixed in a kitchen-type blender. The resulting polishing composition was found to be a gel-like composition suitable for polishing white marble surfaces.

EXAMPLE IV

A gel carrier was prepared, as set forth in Example III. To this was added 25 grams of 1000 grit aluminum oxide; 16 grams of tin oxide; 8 grams of shellac flake; 9 grams of pine resin; 6 grams of black iron oxide; and 64 grams of "Black Marble Mix" obtained form Eastern Marble Supply of Scotch Plain, N.J. The gel and the remaining constituents were blended together in a kitchen-type blender. The resulting polishing composition was found to be a gel-like composition suitable for polishing black marble surfaces.

EXAMPLE V

A gel carrier was prepared, as set forth in Example III. To this gel carrier was added; 25 grams of 1000 grit aluminum oxide; 16 grams of tin oxide; 8 grams of shellac flake; 9 grams of pine resin; and 58 grams of Eastern Marble Supply "Dark Marble Mix". The gel carrier and powdered constituents were blended in a kitchen-type blender.

A gel-like polishing composition was obtained which was found to be suitable for polishing of dark marble.

EXAMPLE VI

A gel carrier was prepared, as set forth in Example III. To this gel carrier was added 25 grams of 1000 grit aluminum oxide; 10 grams of potassium oxalate; 8 grams of shellac flake; and 60 grams of Eastern Marble Supply "5X Polish Powder". The gel carrier and these constituents were mixed in a kitchen-type blender.

A gel-like polish composition was obtained which was found to be suitable for polishing of light marble.

Thus, the advantages of the present invention are that the polishing constituents are premeasured in the gel material and are suspended therein for providing substantially immediate polishing of the work surface.

While the above description constitutes the preferred embodiment of the present invention, it is to be appreciated that the invention is susceptible to modification, variation and change without departing from the proper scope and the fair meaning of the accompanying claims.

What is claimed is:

1. A gel-type polishing composition for improved polishing of stone type surfaces comprising a mixture of:
    a polishing constituent mixture including an abrasive grit material; and
    a gel-like carrier agent comprising a polyvinyl alcohol and water mixture for at least temporarily maintaining the polishing constituent intermixed in suspension immediately prior to and during application of the polishing composition to the surface.

2. The polishing composition of claim 1 further comprising a floculating agent for assisting in maintaining the polishing constituent mixture in suspension for extended periods of time.

3. The polishing composition of claim 1 wherein said polishing constituent mixture further includes an etching agent.

4. The polishing composition of claim 3 wherein said etching agent is an oxalic acid powder.

5. A marble and stone polishing composition comprising a mixture of:
    an oxalate source to form an oxalic acid etching agent;
    an abrasive grit polishing material;
    a gel carrier agent prepared from a mixture of polyvinyl alcohol and water, for at least temporarily holding the oxalic acid etching agent and the abrasive grit polishing material intermixed in suspension immediately prior to and during application of the polishing composition to the work surface.

6. A process of polishing a stone surface comprising the steps of:
    a) providing a polishing composition comprising a polishing constituent mixture including an abrasive grit material intermixed in suspension in a gel carrier agent comprising a polyvinyl alcohol and water mixture;
    b) applying the polishing composition to the stone surface; and
    c) working the polishing composition into the stone surface for substantially immediate polishing of the stone surface.

7. The process of claim 6 wherein said polishing constituent mixture includes an etching agent.

8. The process according to claim 7 wherein said etching agent is oxalic acid.

9. A process of polishing a stone surface comprising the steps of:
    a) mixing effective amounts of a source of an oxalate for forming an oxalic acid etching agent, a polishing abrasive grit material, water and an effective amount of polyvinyl alcohol for at least temporarily suspending the oxalic acid abrasive grit in the gel formed by the polyvinyl alcohol and water;
    b) applying the suspension mixture of step a) and water to a surface to be polished; and
    c) working the suspension mixture into the surface to be polished, wherein the suspension mixture provides substantially immediate polishing of said surface.

* * * * *